United States Patent [19]

Suter

[11] Patent Number: 4,723,788

[45] Date of Patent: Feb. 9, 1988

[54] TRAILER HITCH ALIGNMENT APPARATUS

[76] Inventor: James G. Suter, P.O. Box 852, Lakeside, Calif. 92040

[21] Appl. No.: 875,173

[22] Filed: Jun. 17, 1986

[51] Int. Cl.$^4$ ............................................. B60D 1/06
[52] U.S. Cl. ...................................... 280/477; 33/264; 116/28 R
[58] Field of Search ............................ 280/477; 33/264; 116/28 R; 280/507

[56] References Cited

U.S. PATENT DOCUMENTS

| 3,363,318 | 1/1968 | Folkins et al. ............... 280/477 X |
| 3,765,703 | 10/1973 | Voelkerding ..................... 280/477 |
| 3,918,746 | 11/1975 | Lehtisaari ........................ 280/477 |
| 4,012,056 | 3/1977 | Christenson .................... 280/477 |
| 4,156,972 | 6/1979 | Vankrevelen ................ 280/477 X |
| 4,169,610 | 10/1979 | Paufler .............................. 280/477 |
| 4,583,481 | 4/1986 | Garrison ...................... 280/477 X |

FOREIGN PATENT DOCUMENTS

| 3139264 | 4/1983 | Fed. Rep. of Germany ...... 280/477 |
| 934358 | 8/1963 | United Kingdom ................ 280/477 |

Primary Examiner—John J. Love
Assistant Examiner—Charles R. Watts
Attorney, Agent, or Firm—Ralph S. Branscomb

[57] ABSTRACT

An apparatus for facilitating the alignment of a trailer hitch socket with the ball mounted on the towing vehicle is provided wherein a couple of interfitting masts are used. The first mast mounts atop the socket on the trailer tongue and extends vertically upward high enough to the point which it is visible from the towing vehicle. The second mast has a collar to engage it on the ball of the trailer hitch attached to the towing vehicle. It also extends upwardly to a height at which it is visible from within the towing vehicle. As the vehicle backs up toward the trailer, the driver can see the two masts and steer such that they will come closer and closer together and finally nest together when the socket is directly over the ball.

6 Claims, 8 Drawing Figures

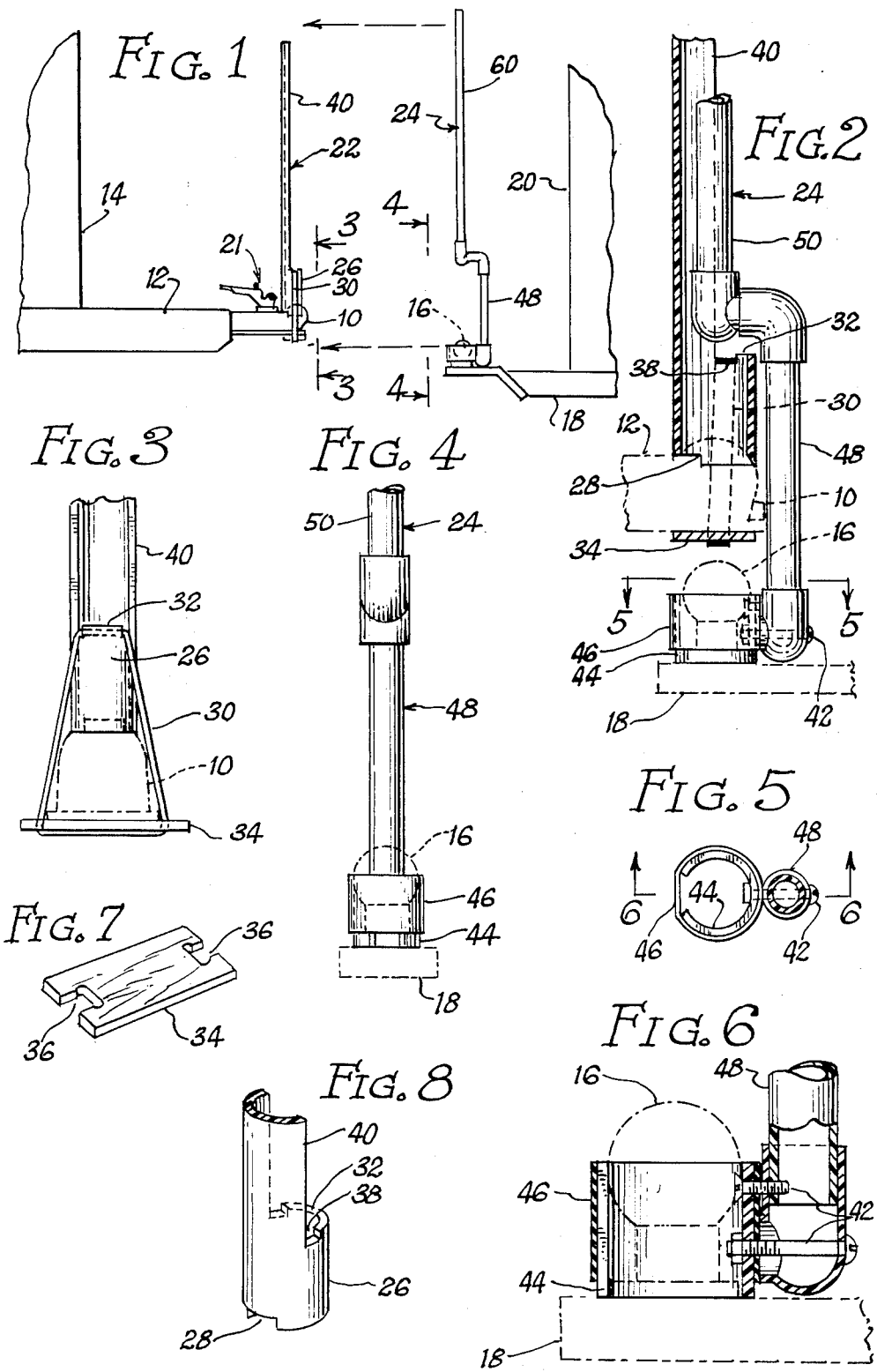

TRAILER HITCH ALIGNMENT APPARATUS

BACKGROUND OF THE INVENTION

Anyone who has ever driven a vehicle towing a trailer is familiar with the problem of backing the vehicle up until the towing ball aligns approximately with the socket on the tongue of the towed vehicle (trailer).

The ball mounted on the towing vehicle is not visible from the driver's seat, so he can only image where the ball is as he backs up toward the tongue of the trailer. As he comes close enough to the trailer, the socket of the trailer also becomes invisible behind the towing vehicle, so that he must imagine where both the ball and the socket are.

Naturally, when there is another person around to give verbal and hand signals, it becomes somewhat easier for the driver to align the ball in the socket. Even this is sometimes tricky, inasmuch as in addition to the fact that both ball and socket are or will become invisible before they are aligned, movement and motions are also reversed in the rearview mirror, and the vehicle motion itself is reversed because the steering wheel is on the front. When the driver turns to the left, the front of the vehicle moves to the right and the rear of the vehicle moves, with the ball, to the left, but it looks as though it were moving to the right in the rearview mirror.

With so many confusing signals to the driver, it is a real trick to properly align the ball and socket. Although an experienced driver may make the proper alignment the first time, an inexperienced driver will often need to stop the vehicle, get out and check the alignment, get back in and pull forward and try backing up again, to move the ball a foot or more to the left or right, or further rearwardly.

Depending on the weight of the trailer, the proper alignment with the towing vehicle can be critical. If the trailer tongue is extremely heavy, it will be necessary for the driver to position the ball immediately beneath the socket, because virtually no tugging of the trailer will be possible. It will have to be jacked down directly onto the ball. Devices have been created which will release some of this pressure and permit the trailer tongue to be rocked back and forth somewhat in its elevated position, although a perfect alignment in the first place would clearly be superior.

Additionally, complicated schemes have been developed utilizing a reel-in guide wire attached between the ball and socket with alarms indicating whether the vehicle is too forward left or right, and when it finally aligns. Other devices include "scoops," that fan out from the socket, which in effect provide a larger target area for the ball and guide it into place beneath the socket.

These types of devices and more lend credence to the fact that it is recognized in the world at large that backing up towing vehicles to align a ball with a trailer socket is a major nuisance.

SUMMARY OF THE INVENTION

The instant invention solves the above-stated problem and abates the nuisance discussed in a very simple, economic, and straightforward means utilizing a pair of masts which extend vertically upwardly from above the socket on a trailer, and above the ball on the towing vehicle, respectively. These masts are sufficiently high that they may be seen directly by the driver of the towing vehicle through the rearview mirror. Naturally, he can also turn around and look at them directly so their directions do not appear to be reversed through the rearview mirror.

The mast which is mounted above the trailer socket is longitudinally split along most of its height to provide a forwardly open, semi-cylindircal configuration. The mast mounted above the ball, on the other hand, is cylindrical, and is configured so that it will nest inside the semi-cylinder attached to the trailer. The semi-cylinder is of a considerably larger diameter to permit the cylinder attached to the towing vehicle to nest within it.

The first mast, which is attached to the trailer, is a color which contrasts with that of the second mast, such as being black, contrasted to the white of the second mast. Additionally, the second mast preferably extends further upwardly than the first mast to make the mating process even more easy to follow visually.

BRIEF DESCRIPTION OF THE DRAWINGS

FIG. 1 is a side elevation view illustrating somewhat diagrammatically the use of the apparatus;

FIG. 2 is a side elevation view of the portions of the apparatus closer to the ball and socket, indicating the alignment;

FIG. 3 is a view taken along line 3—3 of FIG. 1;

FIG. 4 is a view taken along line 4—4 of FIG. 1;

FIG. 5 is a section taken through line 5—5 of FIG. 2;

FIG. 6 is a vertical section taken through a portion of the ball engaging collar of the section mast;

FIG. 7 is a perspective view of the socket spanner plate; and,

FIG. 8 is a perspective view of a fragment of the bottom portion of the first mast illustrating the notch which passes over the flange of the ball-securing lock apparatus.

DETAILED DESCRIPTION OF THE PREFERRED EMBODIMENT

As indicated in FIG. 1, the primary purpose of the invention is to align the socket 10 defined in the tongue 12 of the trailer 14 with the ball 16 which extends upwardly from the hitch 18 of the towing vehicle 20. The orientation in which the ball and socket should finally align is illustrated in FIG. 2. The socket 10 is directly above the ball 16, and can be lowered into engagement without having to move the socket or the ball laterally, forwardly or rearwardly. Once in the position of engagement of the ball with the socket, the ball clamp assembly 21 is rotated into place and clamped, securing the ball in the socket.

The apparatus that is used in the instant invention to align the ball and socket comprises a first mast 22 and a second mast 24. The first mast has a cylindrical lower portion 26 which rests just above the socket defined in the tongue. The bottom of the mast has a notch 28 cut in the rear portion of it, as best seen in FIG. 8, to clear a mounting fla.ge, not shown, which is almost always projecting forwardly from the front of the ball clamp 20.

The first mast is held in place by an elastic band 30 which extends across a shoulder 32 and around the bottom of the tongue, across the socket. In a preferred embodiment, there is a spanner plate 34 with a pair of notches 36 cut in the sides through which the elastic band is entrained, as best shown in FIG. 1. The spanner stabilizes the elastic band and helps keep the first mast from slipping. In addition, a pair of notches 38 are cut into the shoulder 32 to stabilize the position of the elastic band.

The first mast is preferably made from a lightweight length of 2" PVC plumbing pipe. In the preferred embodiment, it was black. The upper portion 50 is longitudinally split to define a half cylinder 40 to nest the second mast 24 as shown in FIG. 2.

The second mast is also constructed from PVC pipe, but in the preferred embodiment is made from white, 1" PVC. The bottom of the second mast is bolted at 42 to a split PVC collar 44, best seen in FIG. 5. This collar is of 2" diameter stock, and slips down frictionally over each of the 2" or 2½" balls commonly used in hitches. Although the friction of the resilient clamping PVC collar is generally enough to retain the mast on the ball, there is additionally an elastic band 46 which passes around the collar and causes an even more frictional gripping of the ball. As shown in FIG. 6, the collar slips down and rests on the horizontal support surface of the hitch, which provides an extra stability as opposed to merely engaging the circumference of the ball itself.

Several elbows and other PVC pipe fittings are used to create a gooseneck 48 which passes up adjacent the ball, and then rearwardly and upwardly again, in a pair of elbow, right angle turns, so that the upper portion 50 of the mast is disposed directly above the ball. The gooseneck extends upwardly sufficiently forward that the second mast clears the cylindrical section 26 of the first mast, with the dimensions being such that the upper portion 50 will nest or seat comfortably in the open, larger diameter pipe of the first mast 22, as shown in FIG. 2.

As mentioned, the first mast is black and second mast is white, so that the contrast is clearly seen as the towing vehicle is backed up to align the ball and socket. Additionally, in the preferred embodiment, the second mast is somewhat taller than the first mast. The projection of the second mast above the first mast provides an additional visual cue to the driver, inasmuch as the top of the second mast is clearly visible, as is the shoulder defined by the wider first mast, of contrasted color, behind the second mast.

The instant invention is simple in concept, economic to manufacture, and very effective. Although the construction could be of material other than PVC pipe, this construction is very lightweight and effective. The simple mounting means for holding both masts to their respective socket and ball members is adequate to maintain the masts upright even in a substantial breeze. Removal of the masts, as well as their initial mounting, is extremely simple and can be done in seconds. Actually, removal could probably be done in less than 1 second, if the driver were in a hurry, and installation takes no more than 3 or 4 seconds.

The invention is an ideal, simple, and direct solution to a simple problem that has been plaguing the drivers of towing vehicles ever since the inception of the trailer and towing vehicle system.

What is claimed is:

1. A trailer hitch alignment apparatus for aligning a ball of a towing vehicle with a socket defined in a tongue of a trailer, comprising:
   (a) a first mast comprising a single pipe having an upper portion and a cylindrical lower portion, said lower portion including a top end and a bottom end, said upper portion being defined by a forwardly opening semi-cylinder formed by a longitudinally cut portion of the pipe; the top end of said lower portion defining a shoulder, the bottom end of said cylindrical lower portion removably mounted on the top surface of the socket defined in the tongue of the trailer, said socket having an open bottom face;
   (b) means for mounting said first mast substantially vertically extended above said socket, comprising an elastic band and an "H" shaped socket spanner plate minus for lying across the open bottom face of said socket, said elastic band being engaged around the shoulder of said first mast and down around the tongue of said trailer and around said "H" shaped socket spanner plate; and
   (c) a second mast having a collar for slipping on and engaging said ball, said ball having a front end and said mast extending upwardly along side the front end of said ball and having a rear-jogging gooseneck which jogs rearwardly to directly above the ball at which point said second mast continues upwardly from just above the height of the shoulder of said first mast.

2. Structure according to claim 1 wherein said first mast and second mast are in contrasting colors to facilitate aligning same.

3. Structure according to claim 1 wherein said second mast extends to above said first mast to facilitate visually following said second mast as the vehicle is moved rearwardly.

4. Structure according to claim 1 wherein the collar of said second mast comprises a resilient split collar which slips over and frictionally engages said ball.

5. Structure according to claim 4 and including an elastic band around said collar to increase the tension of same around said ball.

6. Structure according to claim 5 wherein both of said masts are made from PVC plumbing pipe.

* * * * *